(12) United States Patent
Kluss et al.

(10) Patent No.: US 8,322,755 B2
(45) Date of Patent: Dec. 4, 2012

(54) TUBE COUPLING

(75) Inventors: William Vernon Kluss, Queensland (AU); Gregory Morwood, Victoria (AU)

(73) Assignee: GSA Industries (Aust). Pty. Ltd., Melbourne, Victoria (AU)

( * ) Notice: Subject to any disclaimer, the term of this patent is extended or adjusted under 35 U.S.C. 154(b) by 0 days.

(21) Appl. No.: 12/970,054

(22) Filed: Dec. 16, 2010

(65) Prior Publication Data
US 2011/0140417 A1   Jun. 16, 2011

(30) Foreign Application Priority Data

Dec. 16, 2009 (AU) ................................. 2009906120

(51) Int. Cl.
*F16L 21/02* (2006.01)
(52) U.S. Cl. ........................................ 285/340; 285/314
(58) Field of Classification Search .................. 285/340, 285/316, 314, 315
See application file for complete search history.

(56) References Cited

U.S. PATENT DOCUMENTS

| | | | | |
|---|---|---|---|---|
| 4,630,848 A * | 12/1986 | Twist et al. | ...................... | 285/340 |
| 4,691,943 A * | 9/1987 | DeLand et al. | ................ | 285/315 |
| 4,810,009 A * | 3/1989 | Legris | ............................. | 285/340 |
| 4,919,457 A * | 4/1990 | Moretti | ........................... | 285/340 |
| 4,964,657 A * | 10/1990 | Gonzales | ........................ | 285/340 |
| 5,160,179 A | 11/1992 | Takagi | | |
| 5,292,157 A * | 3/1994 | Rubichon | ....................... | 285/340 |
| 6,517,124 B1 * | 2/2003 | Le Quere | ........................ | 285/340 |
| 6,685,230 B1 * | 2/2004 | Bottura | .......................... | 285/340 |
| 6,824,172 B1 | 11/2004 | Komolrochanaporn | | |
| 7,273,235 B2 * | 9/2007 | Coquard et al. | .............. | 285/340 |
| 7,455,330 B2 * | 11/2008 | Baumgartner | ................ | 285/340 |
| 7,530,606 B1 | 5/2009 | Yang | | |
| 7,600,788 B2 * | 10/2009 | Nicolino | ........................ | 285/340 |
| 7,621,569 B2 * | 11/2009 | Anthoine | ....................... | 285/340 |
| 7,862,089 B2 * | 1/2011 | Crompton | ..................... | 285/340 |
| 8,052,177 B2 * | 11/2011 | Irwin | ............................. | 285/340 |

FOREIGN PATENT DOCUMENTS

| | | |
|---|---|---|
| EP | 0379655 | 8/1990 |
| EP | 1178255 | 2/2002 |
| GB | 2390882 | 1/2004 |
| WO | WO9703314 | 1/1997 |

OTHER PUBLICATIONS

Extended European Search Report dated Aug. 24, 2011 corresponding to European Patent Application No. 10015642.1-2424.

* cited by examiner

*Primary Examiner* — David E Bochna
(74) *Attorney, Agent, or Firm* — Ohlandt, Greeley, Ruggiero & Perle, LLP (57) ABSTRACT

A tube coupling 10 including a tubular housing 11, a seal 12 within the housing 11 and a grab ring 13 for gripping the outside of a tube. The grab ring 13 is mounted within the housing 11 between a first pair of abutments 27 and 28 which are spaced apart axially in the direction of insertion of a tube into the coupling 10. The grab ring 13 is split through its circumference at 29, to allow a radial contraction for insertion into the housing 11 past the first abutment 28. The grab ring 13 can then radially expand for location between the abutments 27 and 28.

5 Claims, 5 Drawing Sheets

FIG 12b

TUBE COUPLING

CROSS REFERENCE TO RELATED APPLICATIONS

This application claims benefit under 35 U.S.C. §119(a) of Australian Patent Application No. 2009906120 filed Dec. 16, 2009, the entire contents of which are incorporated herein by reference.

FIELD OF THE INVENTION

The present invention relates to a pipe or tube coupling (hereinafter a tube coupling), for use with pipes, tubes or conduit (hereinafter collectively referred to as tubes), for connecting a pair of tubes together, or for connecting a tube to an appliance or accessory.

The invention particularly relates to releasable push-fit tube couplings, in which a tube can be pushed into the coupling and retained connected to the coupling by internal fittings of the coupling.

BACKGROUND OF THE INVENTION

Various push-fit tube couplings are available for connecting tubes together, or for connecting appliances or accessories to tubes. Often these couplings are bulky, due to the need to provide room in the coupling for the assembly of the internal coupling components. Because of this, the coupling itself can be awkward to install due to the space it requires, while the material required for the coupling is greater than would be required if the coupling was of a smaller dimensions.

Applicant has recognised therefore, that a tube coupling of reduced external profile would be desirable, both from a space perspective, and from a material consumption perspective.

SUMMARY OF THE INVENTION

The present invention provides a tube coupling, including a tubular housing, a seal within the housing for sealing against the outside of a tube which is inserted into the coupling, a substantially annular and resilient grab ring located within the housing for gripping the outside of a tube which is inserted into the coupling to retain the tube against release from the coupling, the grab ring being mounted within the housing between a first pair of radially inwardly extending abutments which are spaced apart axially in the direction of insertion of a tube into the coupling, the grab ring being split through its circumference to allow radial contraction for insertion into the housing past the first of the abutments in the direction of insertion of a tube into the coupling, whereafter the grab ring radially expands resiliently for location between the abutments.

The present invention also provides a tube coupling, including a tubular housing, a seal within the housing for sealing against the outside of a tube which is inserted into the coupling, a substantially annular and resilient grab ring located within the housing for gripping the outside of a tube which is inserted into the coupling to retain the tube against release from the coupling, the grab ring being mounted within housing between a first pair of radially inwardly extending abutments which are spaced apart axially in the direction of insertion of a tube into the coupling, a demount member for releasing the grab ring from a condition of gripping the outside of a tube which is inserted into the coupling, the demount member being at least partially within the housing, the demount member including a grab ring engaging section and a drive section, the drive section being drivable to shift the engaging section into engagement with the grab ring, one or more cams being provided projecting from the housing for engagement by a tool, cooperation between the tool and the one or more cams being such that rotation of the tool relative to the coupling causes the tool to shift axially to drive the drive section of the demount member to shift the engaging section into engagement with the grab ring.

A tube coupling of a substantially minimal diameter relative to the external diameter of the tube which is to be inserted into the coupling can be provided by the present invention. This advantage is provided in part by providing the grab ring with a split through its circumference. By that arrangement, the grab ring can be made to radially contract for insertion into the tube housing and to resiliently expand upon positioning within the housing between the first pair of radially inwardly extending abutments. This contrasts with some tube couplings of the prior art, in which the grab ring is formed without facility for radial contraction, so that the housing must be of a diameter which enables the grab ring to be inserted without radial contraction. Usually this requires a component to be inserted into the housing following insertion of the grab ring into the housing for maintaining the grab ring in position within the housing. Thus, an extra separate component is required in these forms of prior art. This represents a further advantage of the invention in which the number of separate components of a tube coupling can be reduced compared to some tube couplings of the prior art.

Advantages provided by the ability to reduce the external diameter or profile of the tube coupling include potentially greater ability to install the coupling in areas of limited space, and a reduction in the cost of the coupling, due to a reduction in the material required to manufacture the coupling. This later advantage is considered to be very commercially attractive, given that often tube couplings of the kind envisaged by the present invention are manufactured from metal materials, in particular brass. As the cost of brass increases, material savings in manufacture of such tube couplings become more attractive.

The seal of the tube coupling is preferably an O-ring seal which is flexible and which can be resiliently distorted from an annular configuration for insertion into the coupling housing. The seal can be formed for any suitable elastomer material, such as synthetic rubbers, for example silicone or EPDM rubbers (ethylene propylene diene monomer rubber), thermoplastic elastomers, polyolefins, polyurethanes etc.

A seal can be located between a pair of radially inwardly extending abutments, which are additional to the first pair of radially inwardly extending abutments of the coupling described above. This second pair of inwardly extending abutments can be spaced apart axially in the direction of insertion of a tube into the coupling and can be spaced axially inboard of the first pair of abutments. In some forms of the invention, an abutment of each of the first and second pairs of abutments is formed on a radially inwardly extending projection. The abutments can be formed on opposite sides of the inwardly extending projection so that they face in opposite directions. The projection can be a projection which is formed integrally with the housing, or it can be a projection which is fixed to the housing.

One or both of the abutments of one or both of the first and second pairs of abutments can be formed integrally with the housing. Alternatively, abutment inserts can be fitted into the housing to form these abutments.

It is the case therefore, that in some forms of the invention, the seal is located between a pair of radially inwardly extending abutments which are separate from the radially inwardly extending abutments between which the grab ring is located. The respective pairs of abutments can be spaced apart axially within the housing. The spacing can be such that they are closely adjacent to one another.

In some forms of the invention therefore, the seal is located between a pair of radially inwardly extending abutments defined by an annular recess which opens radially inwardly within the housing and which is spaced apart axially inboard from the first pair of abutments in the direction of insertion into the tube coupling. In these forms of the invention, the recess includes a base and a pair of walls extending from the base and the seal bears at least against the base when sealing against the outside of a tube which is inserted into the coupling.

The grab ring can be formed of any material. A suitable spring steel can be employed, while other suitable materials include brass and copper. The grab ring can comprise a substantially annular ring from which depends a plurality of radially inwardly extending projections or teeth. The projections or teeth can be spaced apart equally about the ring. The ring can be split between adjacent projections or teeth.

In some forms of the invention the tube coupling can include a demount member for releasing the grab ring from a condition of gripping the outside of a tube which is inserted into the coupling. The demount member can be disposed at least partially within the housing and can extend out of the housing.

The demount member can include a grab ring engaging section and a drive section. The drive section is drivable to shift the engaging section into engagement with the grab ring. The engaging section and the drive section can be formed integrally and one can extend from the other. In some forms of the invention, the demount member, including each of the engaging section and the drive section, is formed as an annular ring, which can be a continuous ring or a split ring and which can be rigid or flexible.

In some forms of the invention, the drive section extends axially out of the housing beyond one open end of the housing. In other forms, the drive section extends to a position inboard of the open end of the housing, while in still further forms of the invention, the drive section extends to a point approximately flush with or equal to the end of the housing. The latter two arrangements have the advantage that the likelihood of accidental demounting of the grab ring in the field is lessened because the end of the drive section is not protruding from the housing, or is only just protruding.

The drive section can present an abutment or other face for engagement by a suitable tool, or by a finger engagement, for driving the drive section to drive the engaging section to engage the grab ring. The drive section can be driven to rotate or can be driven axially to drive the engaging section to engage the grab ring. Where the drive section is driven to rotate to drive the engaging section, that rotation can be through threaded connection between the demount member and a surface of the coupling. Axial movement of the drive section can be limited in a direction away from the housing, such as by a suitable abutment or abutments. Axial movement can be guided by suitable key engagement between the demount member and a surface of the coupling.

Upon engagement of the engaging section with the grab ring, the grab ring can be released from a condition of gripping the outside of a tube which is inserted into the coupling. The abutment of the drive section described above can be an end face of an annular or part annular portion of the drive section and in some forms of the invention, the annular portion is of a diameter which is just slightly greater than the outside diameter of a tube which is intended for an insertion into the coupling. For example, if the coupling of the invention is designed for a tube having an outside diameter of 25 mm, then the annular portion which defines the end face, can have an inner diameter of approximately 26 mm or 27 mm so as to sit closely adjacent the outside surface of the tube.

In some forms of the demount member, a tool can be employed to engage the demount member to drive the demount member axially within the housing of the coupling to engage the grab ring. The tool can be a manual tool which can be fitted about the outside of a tube which extends into the coupling and the tool may be slid along the outside surface of the tube and into engagement with the demount member. The tool might employ a leverage to assist shifting of the demount member to disengage the grab ring, or it might simply be drivable by finger pressure.

The tool can be part annular so as to define a circumferential gap which enables it to be fitted over or about a tube which is fitted to a coupling for engagement of the demount member. The section of the tool which is absent to define the gap can be only a small section whereby the tool is flexed resiliently to open the gap further as necessary when the tool is to be fitted about a tube, or the gap can be wider, for example up to 50% of the circumference of the tool so it can be fitted over the tube without needing to be flexed, or with only a small amount of flexing.

The tool can alternatively be hinged to enable it to be opened for fitting about a tube. In that arrangement, the tool can include a latch or connection at the at the ends of the tube that define the opening to close the tool when it has been fitted about a tube. A snap connection can be employed for example.

The tool can be arranged to maintain the grab ring in a position in which the grab ring cannot grab a tube which is inserted into the coupling. This advantageously allows installation or assembly personnel freedom to manipulate the coupling without having to manually maintain the tool in engagement with the grab ring. This can be advantageous when an installer requires both of his or her hands to install or remove the coupling. In some forms of the invention, this is achieved by arranging the tool to cooperate with a portion of the coupling which is separate from the demount member, such as the housing. For example, the tool can cooperate with the housing so that when the tool has positioned the demount member at a position at which the grab ring will not engage the outer surface of a tube, the tool is maintained in that position by cooperation with the housing. Arrangements that have this capability include a tool which can shift axially relative to the housing to shift the demount member into the housing to engage the grab ring and which can fix in place on the housing, such as by a snap fit or a bayonet fit. Other arrangements such as threaded connection could also be employed.

In one arrangement for use with couplings according to the invention, one of the tool or the housing includes a cam surface that is arranged to bear against a cam so that rotation of the tool translates into axial movement of the tool relative to the housing. The tool can include the cam surface and the housing can include the cam, which can be in the form of one or more lugs. While a single lug can be employed, two, three or four lugs is preferred, with the lugs spaced equidistantly about the circumference of the housing. Forming lugs on the housing is relatively simple as the housing is expected to be cast from metal or plastic. Forming the cam surface on the tool is also relatively simple as the tool is expected to be moulded from plastic.

The cam surface can be a ramp that shifts the demount member axially as the tool rotates. The ramp can have a lineal or non-lineal inclination.

The present invention can also include a retainer for retaining the grab ring at a position between the first and second abutments and for cooperating with the demount member if provided. Indeed, the invention provides a tube coupling which has a retainer or a demount member or both.

The retainer can be formed as an integral part of the housing and in one form can comprise a radially inwardly extending projection, which forms an abutment for cooperation with the demount member. Alternatively, the retainer can be formed separately from the housing and then inserted into the housing as part of the assembly process of the tube coupling.

In the later form of retainer described above, the retainer can be arranged to cooperate with the housing for location relative to the housing. For example, the retainer can include a radially outwardly extending abutment which cooperates with a radially inwardly extending abutment which extends from the housing. That inwardly extending abutment can be formed integrally with the housing. That inwardly extending abutment can be one of the first pair of radially inwardly extending abutments between which the grab ring is located.

The retainer can further include a radially inwardly extending abutment which cooperates with a radially outwardly extending abutment of the demount member. The inwardly extending abutment of the retainer can cooperate with the outwardly extending abutment of the demount member when the demount member is in a position for engaging the grab ring, but has not been shifted to actually engage the grab ring. That is, the demount member and the retainer can be in a cooperating engagement prior to the demount member being driven to engage the grab ring to release the grab ring from gripping engagement with the outside of the tube. It is to be noted that the demount member might be positioned so that it is in close proximity to the grab ring, such as in touching engagement with the grab ring, at times when the grab ring is to be maintained in a condition of gripping the outside of a tube which is inserted into coupling, but prior to the demount member being shifted to a position of releasing the grab ring from gripping the outside surface of a tube. Thus, the demount member can have two conditions, a first being a condition in which it is in abutting engagement with the retainer and in that condition, it can be spaced from engagement with the grab ring, or in light engagement with the grab ring. In the second condition, the demount member is shifted relative to the retainer into sufficient engagement with the grab ring to release the grab ring from gripping engagement with the outside surface of a tube.

The housing can include a recess which opens radially inwardly and which defines the first pair of radially inwardly extending abutments. In this arrangement, a first of the pair of the inwardly extending abutments can be engaged by the radially outwardly extending abutment of the retainer described above and a second of the pair of inwardly extending abutments can be engaged by the grab ring. In this arrangement, the second of the pair of inwardly extending abutments is axially inboard of the first of those abutments. This arrangement is advantageous because the grab ring can be secured within the housing by the respective first pair of inwardly extending abutments, regardless of whether the retainer is also fitted to the coupling. While it is normally the case that the retainer would be fitted to the coupling, under certain conditions, and over time, components of a coupling can deteriorate and can even disintegrate to the point where they no longer are maintained as part of the coupling. For example, if the retainer is manufactured out of a plastic material, under certain acidic conditions, the plastic can deteriorate over time to the point at which the retainer disintegrates and is lost out of the coupling. In some prior art arrangements, under these conditions, the grab ring would no longer be retained within the housing and would then be free to be released from within the coupling. As a consequence, a tube which is inserted within the coupling might be inadvertently released. This can have obvious detrimental and potentially catastrophic results, in terms of flooding, or release of toxic liquids or gases.

However, in a tube coupling according to the present invention, the grab ring can be located within the tube coupling between a pair of radially inwardly extending abutments, which locate the grab ring regardless of whether the retainer is in place or not. Accordingly, disintegration of the retainer will not allow the grab ring to be released from the tube coupling and thus a tube which is inserted into the coupling is maintained connected to the coupling. What might occur is that the tube could have increased freedom of movement, by the absence of the retainer positioned between the abutments between which the grab ring is located, but that movement would not be sufficient to allow complete release of the tube from within the coupling. This aspect of the present invention is considered to be a significant safety advantage, which is not evident in other tube couplings of the prior art.

For a better understanding of the invention and to show how it may be performed, embodiments thereof will now be described, by way of non-limiting example only, with reference to the accompanying drawings.

DETAILED DESCRIPTION OF THE DRAWINGS

Figure 1:
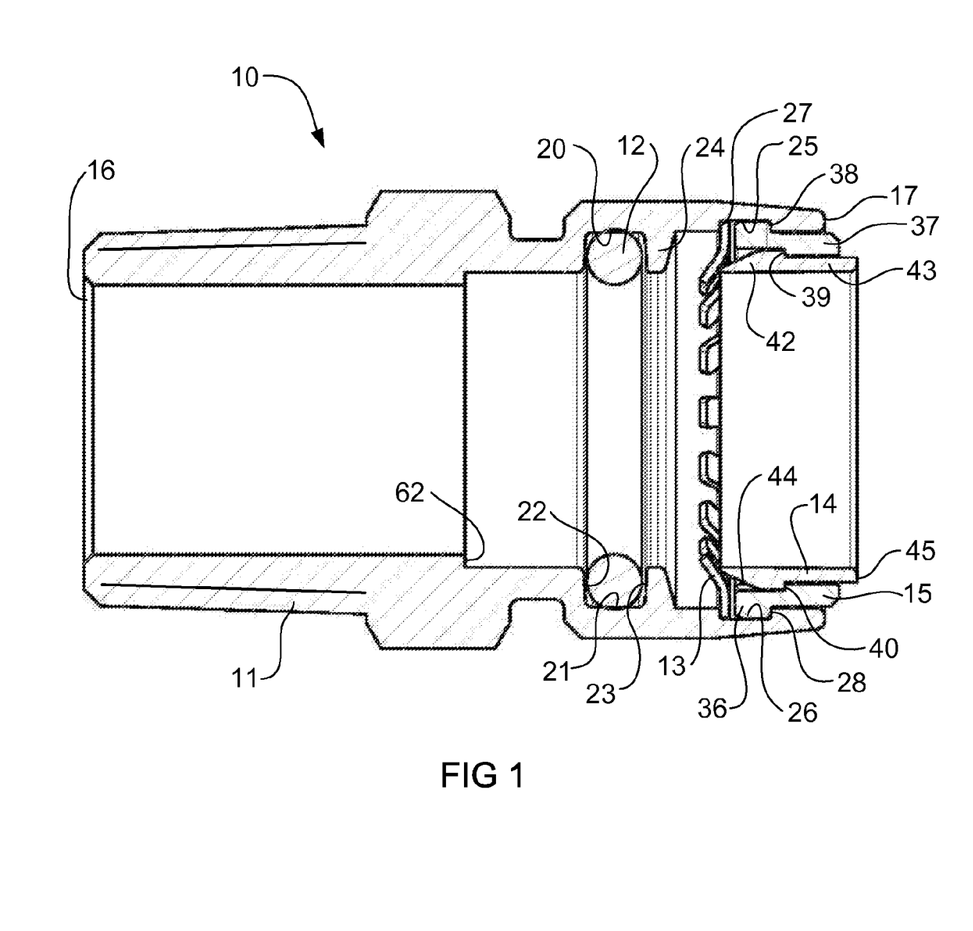
FIG. 1 is a cross-sectional view of a tube coupling according to one embodiment of the invention.
Figure 2:
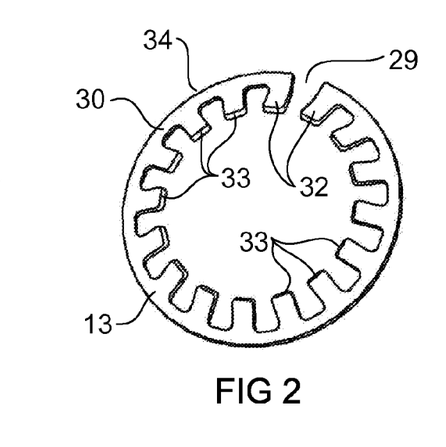
FIG. 2 is a perspective of the grab ring of the tube coupling illustrated in FIG. 1.
Figure 3:
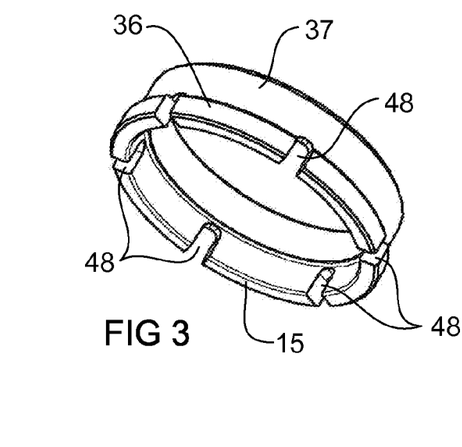
FIG. 3 is a perspective view of the retainer of the tube coupling illustrated in FIG. 1.

FIG. 1 illustrates a tube coupling 10 which includes a housing 11, a seal 12, a grab ring 13, a demount member 14, and a retainer 15. The grab ring 13 is also illustrated in FIG. 2, while the retainer 15 is illustrated in FIG. 3.

The housing 11 is of an elongate form, having a pair of opposite open ends 16 and 17. The end 16 is intended for fitting to an accessory or appliance or the like, or to another tube, while the end 17 is the end into which a tube can be inserted for gripping. The housing 11 is cylindrical, although it can be seen from FIG. 1, that both the outside surface and the inside surface are of irregular profile, to suit the particular circumstances and components to which the housing 11 is to be applied. The end 16 of the housing can be threaded if required.

At the open end 17, the housing 11 accommodates each of the demount member 14 and the retainer 15. Inboard of the retainer 15, is the grab ring 13. Further inboard of the grab ring 13 is the seal 12.

The seal 12 is accommodated within an annular recess 20, which comprises a base 21, and side walls 22 and 23. As illustrated in FIG. 1, the seal 12 bears against the base 21. When a tube (not shown) is inserted into the coupling 10, the seal 12 also bears against the outside surface of the tube. By this bearing arrangement, the seal 12 seals against leakage of fluid from within the tube and out of the open end 17.

The side walls 22 and 23 of the recess 20 form radially inwardly extending abutments between which the seal 12 is located. Each of these abutments is formed integrally with the housing 11, while the side wall abutment 23 is formed as part of a projection 24 which extends from the housing 11.

Insertion of the seal 12 into the recess 20 is by deforming the seal 12 into a shape which allows it to move past the projection 24 and into the recess 20. As the seal 12 typically will be a flexible elastomeric material, it is envisaged that location of the seal 12 within the recess 20 is a simple and easy step to accomplish.

The housing 11 further defines a recess 25 within which edge portions of both the grab ring 13 and the retainer 15 are located. The recess 25 includes a base 26 and a pair of side walls 27 and 28, each of which forms one of a pair of radially inwardly extending abutments.

With reference to FIG. 2, at least a portion of the annular ring 30 of the grab ring 13 is received within the recess 25. In order to insert the grab ring 13 into the recess 25, the grab ring 13 is radially compressed, which is facilitated by the split 29 which is made through the ring 30. The split 29 is made between adjacent teeth 32. Otherwise, the grab ring 13 includes a plurality of teeth 33 each of which, including the teeth 32, extends from the ring 30 radially inwardly and at an angle which is shown in FIG. 1, so that the teeth accept insertion of a tube through the grab ring 13 and into the coupling 10 and thereafter bite into or grab against the outer surface of the tube to resist release of the tube from within the coupling 10.

The dimensions of the outer diameter of the ring 30 is intended to be such that the edge 34 of the ring 30 bears against the base 26 of the recess 25 once the grab ring 13 has been inserted into the recess 25. That is, while the grab ring 13 is radially contracted by closure of the gap 29 for insertion into the coupling 10 through the open end 17, upon resilient radial expansion of the grab ring 13 within the recess 25, the expansion is such as to bring the edge 34 of the ring 30 into bearing engagement with the base 26 of the recess 25. By this arrangement, further radial expansion of the grab ring 13 is prevented.

However, a loose fit of the grab ring 13 within the recess 25 is acceptable, so complete bearing engagement between the edge 34 and the base 26 of the recess 25 is not required.

The recess 25 also accommodates annular portion 36 of the retainer 15. The annular portion 36 has a greater outside diameter than the annular portion 37 of the retainer 15 and, as shown in FIG. 1, the intention is that the annular portion 36 is received within the recess 25, while the annular portion 37 extends through to the open end 17.

The retainer 15 defines two abutments 38 and 39. The abutment 38 abuts against the side wall abutment 28 of the recess 25, while the abutment 39 cooperates with a facing abutment 40 of the demount member 14. The engaging section 42 is formed with an inclined face 44 which is arranged for engagement with the teeth 32 and 33 of the grab ring 13. The inclined face 44 tends to displace the teeth 32 and 33 radially outwardly in order to disengage the teeth 32 and 33 from a condition of gripping of the outside surface of a tube which has been inserted into a coupling 10.

The cooperation between the demount member 14 and the retainer 15 is such as to permit axial movement of the demount member 14 relative to the retainer 15 for the purpose of moving the demount member 14 into engagement with the grab ring 13. Movement of the demount member 14 towards the grab ring 13 is not resisted by the retainer 15 but movement in the opposite direction towards the open end 17 is resisted when the abutment 40 of the demount member 14 engages the abutment 39 of the retainer 15.

The drive section 43 of the demount member 14 presents an end abutment 45 which can be engaged by a suitable tool, or even by fingers, to push the demount member 14 towards the grab ring 13 for the purpose of releasing the grab ring from gripping engagement with the outside surface of a tube. In FIG. 1, the abutment 45 is positioned axially beyond both ends of the retainer 15 and the housing 11, but in alternative embodiments, the abutment 45 could be flush with the end of the retainer 15, and both could be flush with the end of the housing 11.

Insertion of the retainer 15 into the housing 11 is facilitated by the plurality of slots 48 which extend through the annular portion 36 of the retainer 15. The slots 48 enable the sections between the slots 48 to flex as the retainer 15 is inserted into the housing 11 so that the outer diameter of the annular portion 36 reduces until it reaches the recess 25 and can thereafter resiliently expand and be captured within the recess 25. The demount member 14 can be inserted into the housing 11 prior to insertion of the retainer 15 into the housing 11, and is located by the retainer 15 once the retainer 15 is inserted and the annular portion 36 of the retainer 15 is captured within the recess 25. The demount member 14 can alternatively be inserted into the housing 11 after insertion of the retainer 15 into the housing 11

By the arrangements discussed above, it will be appreciated that each of the grab ring 13, the demount member 14 and the retainer 15 can be easily inserted into the open end 17 of the housing 11, so that the grab ring 13 and the retainer 15 can be captured within the recess 25 and thereby located relative to the housing 11. The demount member 14 can be inserted prior to or after the retainer 15. By forming the grab ring 13 with the split and by allowing radial contraction of the annular portion 36 of the retainer 15, the outside diameter of the housing 11 in the region of the grab ring 13 can be reduced compared to some prior art tube couplings, in which the grab ring 13 is a complete annular member and not split. The tube coupling 10 of the invention is therefore of a reduced external diameter or profile compared to some prior art tube couplings, with resulting benefits provided in a reduction of required space and a reduction in the material required for manufacture of the housing 11.

Figure 4:
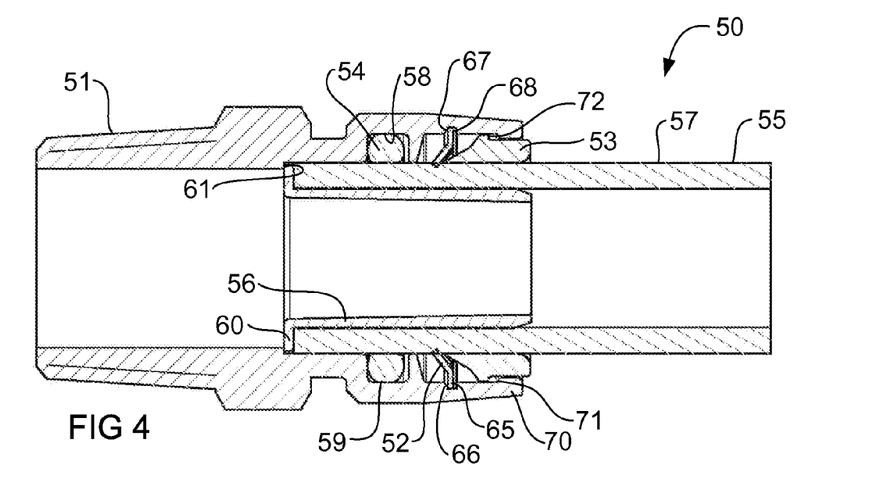
FIG. 4 is a cross-sectional view of a further tube coupling according to the invention.

FIG. 4 is a further cross-sectional view of a tube coupling 50 according to another embodiment of the invention.

It is evident that the coupling 50 has a housing 51 of different external and internal profile compared to the housing 11 of the tube coupling 10. The internal profile of the housing 51 differs principally in relation to the manner in which it locates the grab ring 52 and the demount member 53. The seal 54 is secured substantially in the same manner as the seal 12 of the coupling 10.

Before discussing the arrangement of the grab ring 52 and the demount member 53, it is to be noted that FIG. 4 illustrates a tube 55 which is inserted in to the coupling 50 and which includes a tube liner 56. As is evident from FIG. 4, the seal 54 seals against the outside surface 57 of the tube 55, and is compressed by that engagement to bear in sealing contact with the base 58 of the recess 59 within which the seal 54 is accommodated.

The tube liner 56 is inserted into the leading end of the tube 55 and includes a radial flange 60 to overlie the end of the tube 55. The tube liner 56 is formed of a rigid material and is intended to support the tube 55 at the inner end thereof against collapse. This might occur when a load is applied to the tube 55 to withdraw it from the coupling 50 and the grab ring 52 tends to bite into the outside surface 57 of the tube 55 and apply a radially inward directed load to the tube 55.

The flange 60 of the tube liner 56 abuts against an abutment 61 formed in the housing 51 of the coupling 50. The abutment 61 forms an internal stop representing the maximum insertion distance of the tube 55 into the coupling 50. With reference to FIG. 1, a similar abutment 62 is formed in the housing 11 for the same purpose as that described above in relation to the coupling 50.

The grab ring 52 can have the same construction as the grab ring 13 of the coupling 10. Thus, the annular ring portion 65 of the grab ring 52 is received within a recess 66, which includes a pair of radially inwardly extending abutments 67 and 68, formed by the side walls of the recess 66.

In the coupling 50, the retainer 70 is formed as an integral inwardly extending projection of the housing 11. The retainer thus defines an abutment 71 which locates the demount member 53 upon engagement of the abutment 72 of the demount member 53 with the abutment 71 of the retainer 70.

For insertion of the demount member 53 into the housing 11, the demount member can be split in a similar manner to the grab ring 52, or it can be resiliently flexible.

In other respects, the coupling 50 operates in a similar manner to the coupling 10, such that upon insertion of a tube 55 into the coupling 50, the grab ring 52 permits entry of the tube 55, but bites into the outside surface 57 of the tube 55 if a withdrawal load is applied to the tube 55. In order to override the grab ring 52, the demount member 53 can be pushed axially inwardly of the housing 51 to displace the teeth of the grab ring 52 from engagement with the outside 57 of the tube 55 and thus withdrawal of the tube 55 can be achieved.

Figure 5:
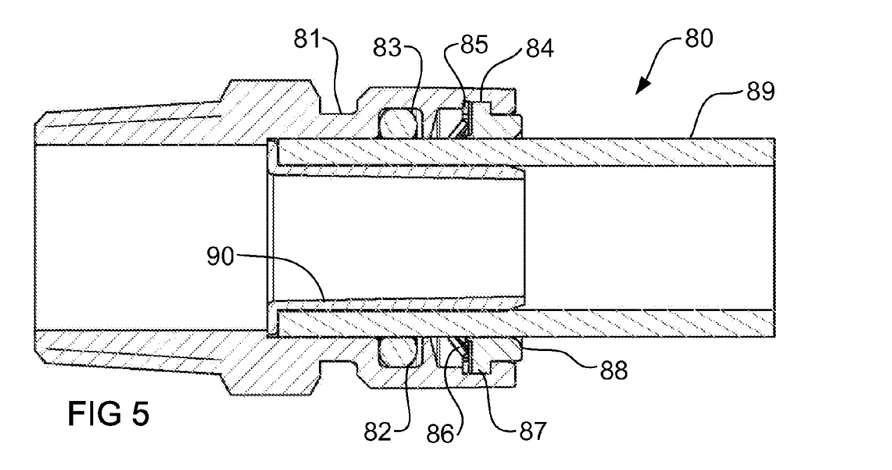
FIG. 5 is a cross-sectional view of a tube coupling according to another embodiment of the invention.

FIG. 5 illustrates a further embodiment of the invention, and illustrates a tube coupling 80 which has a housing 81, which defines a recess 82 within which is disposed a seal 83.

The housing 81 further defines a recess 84 within which is disposed the circumferential edge 85 of a grab ring 86 and an inwardly extending abutment 87 of a retainer 88.

FIG. 5 further illustrates a section of tube 89 and a tube liner 90.

The tube coupling 80 of FIG. 5 is illustrative of a coupling in which a demount member is not provided. Accordingly, the retainer 88 serves to locate the grab ring 86 within the recess 84, and once a tube section 89 is inserted into the coupling 80, it is not intended that that tube section 89 be removed. Accordingly, the provision of a demount member is not required. The use of a retainer improves the performance of the coupling, makes assembly easier and lessens the likelihood of inadvertent demounting of the grab ring.

Figure 6:
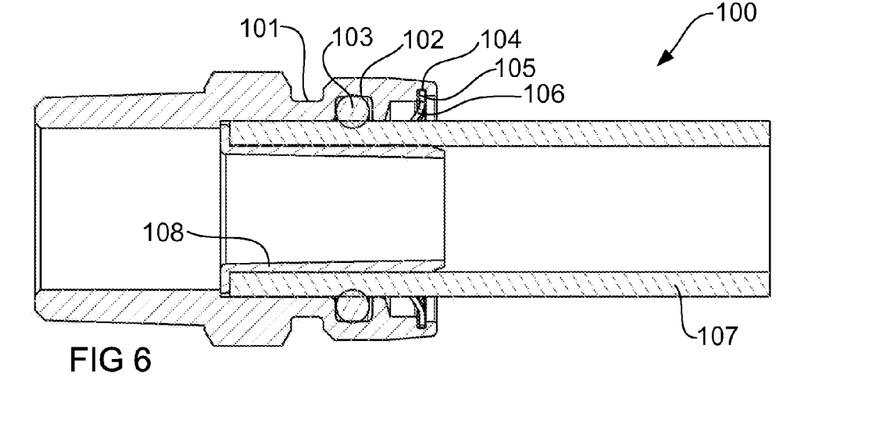
FIG. 6 is a cross-sectional view of a tube coupling according to another embodiment of the invention.

FIG. 6 illustrates a further tube coupling 100, in which the coupling includes neither a retainer or demount member. Accordingly, the tube coupling 100 includes a housing 101, a recess 102 which houses a seal 103, a recess 104 which houses the circumferential edge 105 of a grab ring 106, while FIG. 6 also illustrates a tube portion 107 and tube liner 108.

Like the tube coupling 80 of FIG. 5, the absence of a demount member is intended to infer that once the tube portion 107 is inserted into the coupling 100, it is not able to be removed.

Figure 7:
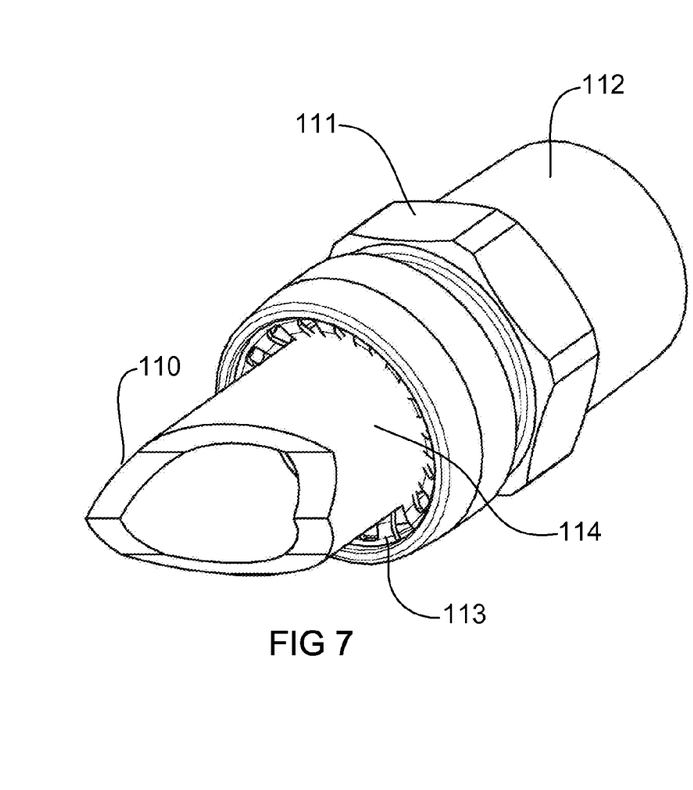
FIG. 7 is a perspective view of a tube coupling according to one embodiment of the invention.

Referring to FIG. 7, this figure illustrates in perspective view, a tube section 110 which is fitted into a tube coupling 111. The housing portion 112 would usually be threaded for connection to another appliance or device. In FIG. 7, it can be seen that the grab ring 113 bites into the outside surface 114 of the tube portion 110.

Figure 8:
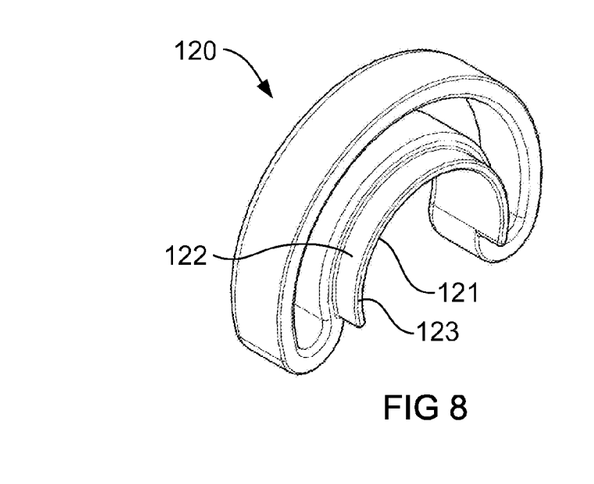
FIGS. 8 and 9 are rear and front views respectively of a tool for demounting a tube coupling according to the invention.
Figure 9:
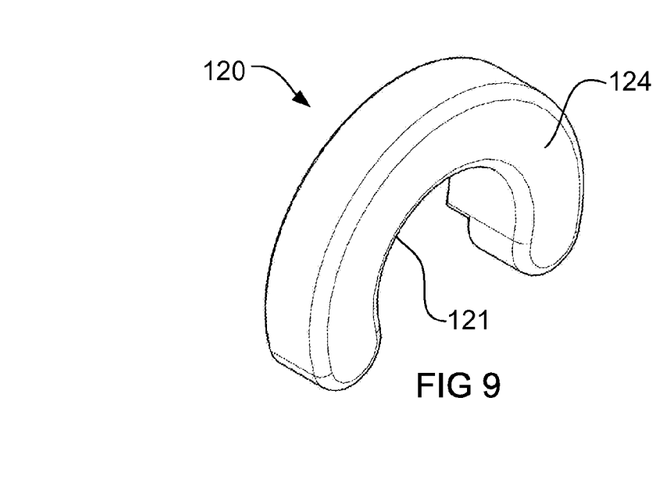

FIGS. 8 and 9 are rear and front views respectively of a tool 120 which is operable to drive the demount members 14 and 53 of the couplings 10 and 50 respectively. The tool 120 is part circular and includes an inside diameter 121 which is approximately the same but just slightly greater than the outside diameter of the tube section which is fitted into the couplings 10 and 50.

The tool 120 is slightly greater than semi cylindrical, and is flexible to be clipped about a tube section and to hold onto that tube section once fitted thereto. The driving section 122 of the tool 120 includes a forward facing abutment 123, which is arranged for engagement with a demount member, in order to push the demount member into engagement with the grab ring. With reference to FIG. 1, the abutment 123 of the tool 120 is arranged to engage the end abutment 45 of the demount member 14 to drive the demount member 14 into engagement with the grab ring 13.

The tool 120 is intended to be a loose fit about a tube section which is fitted into a coupling so that the tool 120 can be easily slid along the tool section. In addition, the tool 120 is provided with a broad pushing surface 124 so that the tool can be pushed by finger pressure to displace the demount member which it engages.

Figure 10:
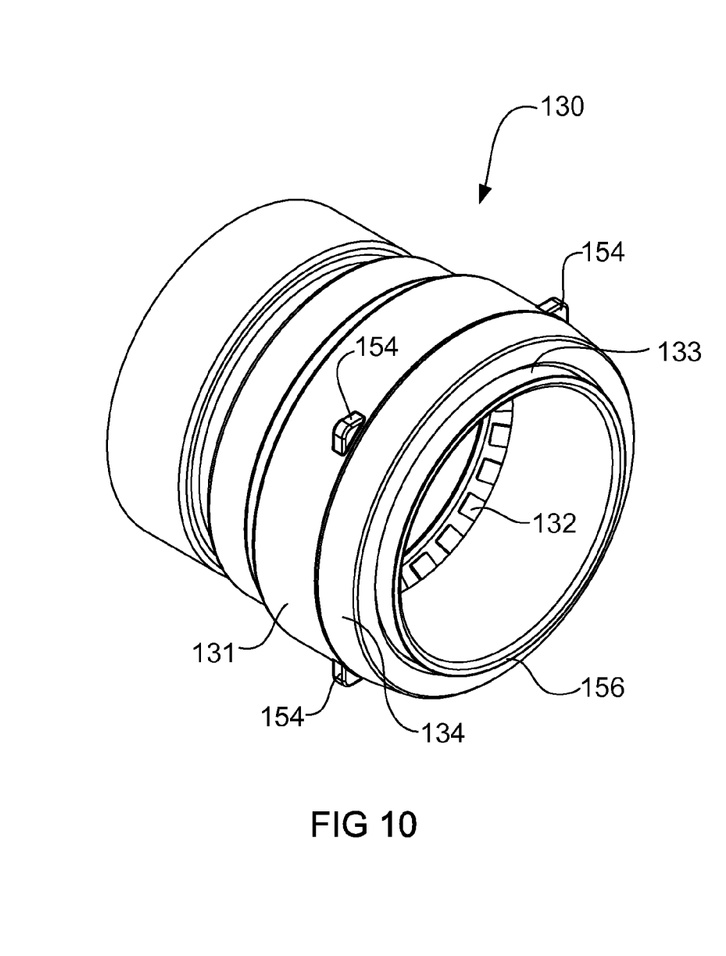
FIG. 10 is a perspective view of a tube coupling according to another embodiment of the invention.

FIG. 10 illustrates a further tube coupling 130 in perspective view. The coupling 130 includes a housing 131, a grab ring 132, a demount member 133 and a retainer 134.

Figure 11:
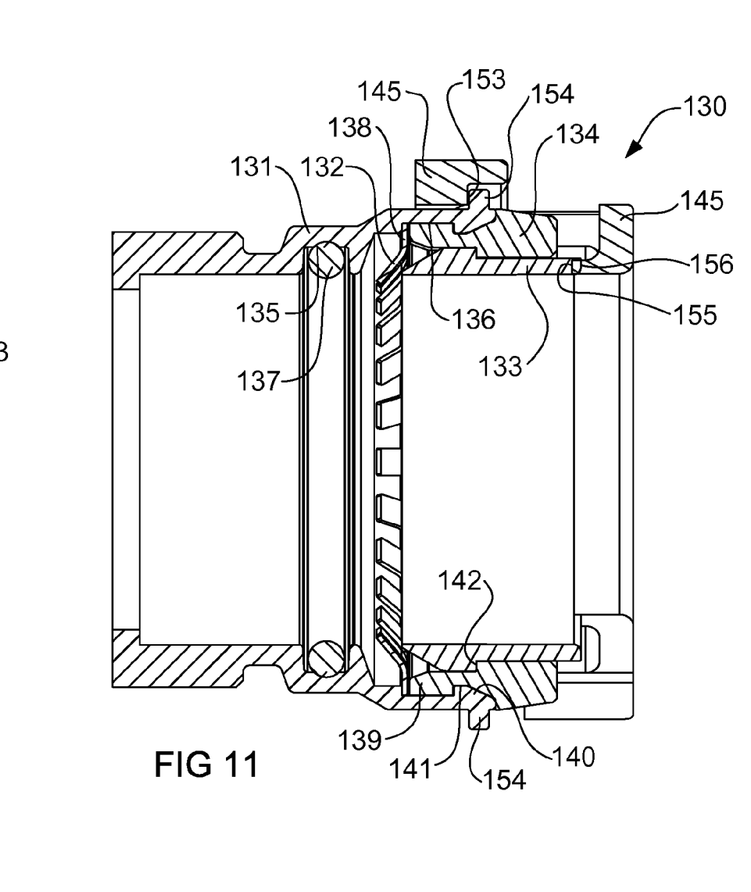
FIG. 11 is a cross-sectional view of a tube coupling of FIG. 10.

FIG. 11 illustrates the coupling 130 in cross-sectional view and further illustrates recesses 135 and 136 within which are disposed the seal 137, the inner end 138 of the grab ring 132 and an axially inboard section 139 of the retainer 134.

The coupling 130 has a slightly different construction to each of the couplings described in relation to the earlier figures. In particular, the retainer 134 is shaped for secure location relative to the housing 131, by nesting engagement with an end projection 140 of the housing 131 into a corresponding recess 141 in the retainer 134.

In other respects, the retainer 134 continues to provide an abutment 142 to locate the demount member 133 against axial movement out of the coupling 130, but which allows axial movement of the demount member 133 to engage the grab ring 132 and to dislodge it from gripping engagement with a tube.

Figure 12A:
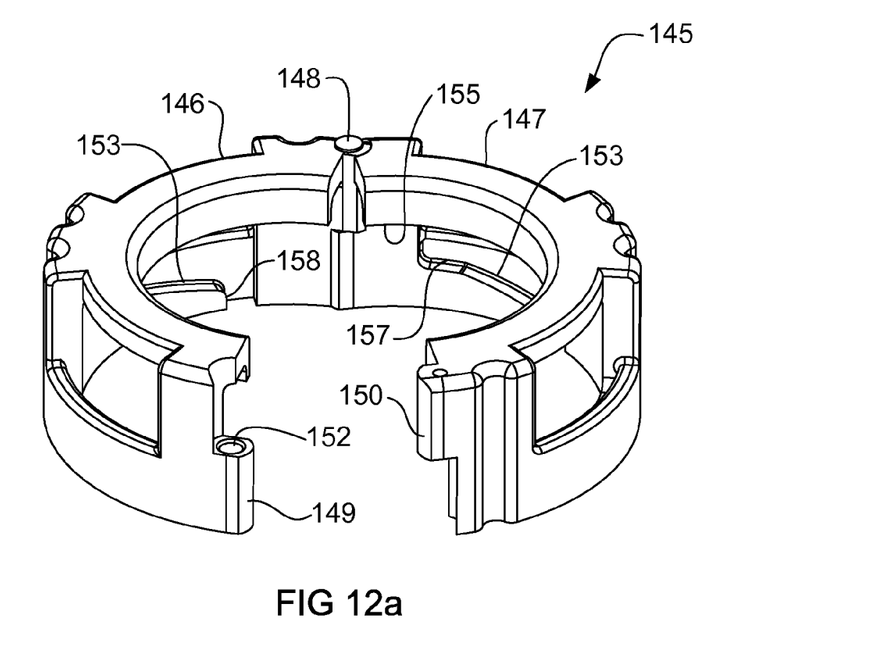
FIGS. 12a and 12b are perspective views of a tool for use with a tube coupling according to the invention.
Figure 12B:
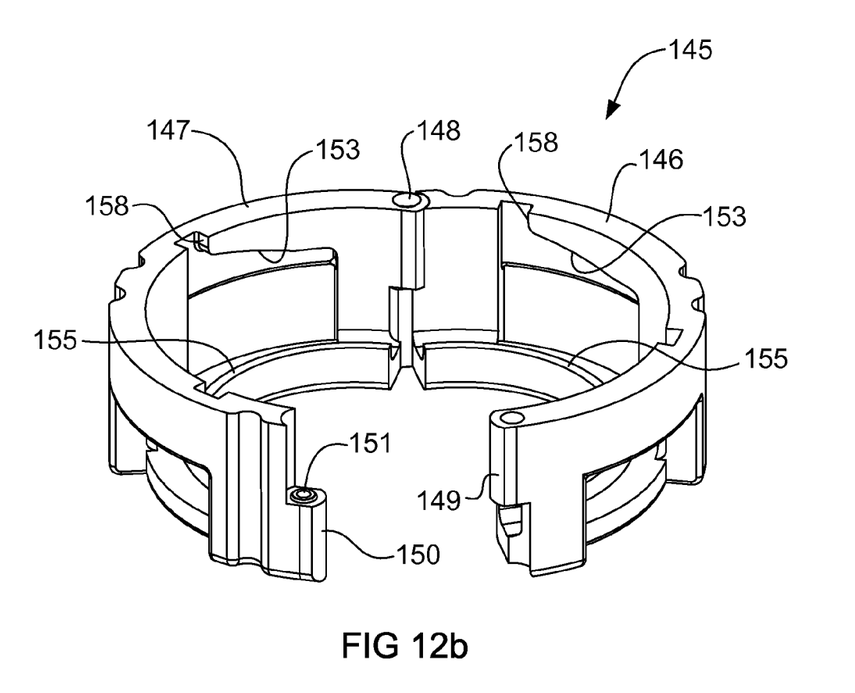

FIG. 11 also illustrates in cross-sectional, view portions of a tool 145 which are not shown in FIG. 10, but which are shown in FIGS. 12a and 12b. Referring to FIGS. 12a and 12b, the tool 145 is shown from opposite sides and in a partially open condition. From those figures, it can seen that the tool 145 comprises a pair of parts 146 and 147 which are hingedly connected at hinge 148 and which can snap together at opposite free ends 149 and 150. The connection between the free ends is made by a simple ball and recess arrangement, by which the free end 150 includes a ball 151 and the free end 149 includes a recess 152, into which the ball 151 can seat when the free ends 149 and 150 are brought together.

The tool 145 includes four cam surfaces 153, which are provided to cooperate with cams 154 formed as lugs or projections, which project from the outer surface of the housing 131 (see FIG. 10). FIG. 11 illustrates engagement between the cam surface 153 and the cam 154 for one of the cams 154.

The cam surfaces 153 are inclined as evident in FIGS. 12a and 12b and the arrangement is such that the inclined surfaces 153 engage against an axially inboard side of the cams 154 (as shown in FIG. 11), so that on rotation of the tool 145, a trailing surface 155 engages an end abutment 156 of the demount member 133 and further rotation of the tool 145 in the same direction shifts the tool axially inboard by cooperation between the cam surface 153 and the cams 154, which also shifts the trailing surface 155 inboard, thus shifting the demount member 133 inboard. By that shifting movement, the demount member 133 is brought into engagement with the grab ring 132 which dislodges the grab ring 132 from a condition of gripping a tube which has been inserted into the coupling 130.

The tool 145 thus provides a simple mechanism for disengaging a grab ring from a tube. The tool 145 is easy to fit about the coupling 130 and the mechanism provided for axial movement of the tool through a rotation of the tool, provides a mechanical advantage which means that shifting of the demount member 133 into engagement with the grab ring 132 requires little strength.

A further and significant advantage provided by the tool 145, is that once it has shifted the demount member 133 to a position in which the grab ring 132 is disengaged from a tube within the coupling 130, the tool 145 can be locked in that position, so that the grab ring is held in a disengaged condition by the demount ring until the tool is moved to an unlocked position. Thus, installation or assembly personnel can manipulate the coupling 130 and relevant tubes, without having to maintain pressure on the demount member to maintain the grab ring in a disengaged position.

The locking mechanism is provided in a very simple manner by extending the inclined cam surface 153 to a non-inclined surface 157. This is shown in FIG. 12a and it will be appreciated that as the tool 145 is rotated from the start position 158 of the cam surfaces 153 to the opposite end of those surfaces, the demount member 133 will be shifted inboard axially. However, when the cams 154 reach the non-inclined surface 157, there will be no further axial shifting movement of the demount member 133, but rather, the cams 154 will rest again the surfaces 157, and this will maintain the demount member 133 in an axially inboard position for as long as the tool 145 is maintained in that position.

As soon as the coupling 130 has been properly fitted and no further manipulation is required, the tool 145 can be rotated in an opposite direction to allow the demount member 133 to shift axially outboard of the coupling 130 and to release the grab ring 132 to grip a tube which has been inserted into the coupling 130. The tool 145 can then be opened by disengaging the free ends 149 and 150 and can then be released from the coupling 130.

The invention described herein is susceptible to variations, modifications and/or additions other than those specifically described and it is to be understood that the invention includes all such variations, modifications and/or additions which fall within the spirit and scope of the present disclosure.

The invention claimed is:

1. A tube coupling, including
a tubular housing;
a seal within the housing for sealing against the outside of a tube which is inserted into the coupling;
a substantially annular and resilient grab ring located within the housing for gripping the outside of the tube which is inserted into the coupling to retain the tube against release from the coupling;
the grab ring being mounted within housing between a first pair of radially inwardly extending abutments which are spaced apart axially in the direction of insertion of the tube into the coupling;
a demount member for releasing the grab ring from a condition of gripping the outside of the tube which is inserted into the coupling, the demount member being at least partially within the housing the demount member including a grab ring engaging section and a drive section, the drive section being drivable to shift the engaging section into engagement with the grab ring; and
one or more cams being provided projecting from an outside surface of the housing for engagement by a tool, cooperation between the tool and the one or more cams being such that rotation of the tool relative to the coupling causes the tool to shift axially to drive the drive section of the demount member to shift the engaging section into engagement with the grab ring.

2. The tube coupling according to claim 1, wherein the one or more cams comprises two lugs spaced equidistantly about the circumference of the tubular housing.

3. The tube coupling according to claim 1, wherein the one or more cams comprises three lugs spaced equidistantly about the circumference of the tubular housing.

4. The tube coupling according to claim 1, wherein the one or more cams comprises four lugs spaced equidistantly about the circumference of the tubular housing.

5. The tube coupling according to claim 1, wherein the one or more cams are at one end of the tubular housing being the end of the tubular housing through which the tube is inserted.

* * * * *